(12) United States Patent
Hirosawa et al.

(10) Patent No.: US 10,268,064 B2
(45) Date of Patent: Apr. 23, 2019

(54) DISPLAY DEVICE

(71) Applicant: Japan Display Inc., Minato-ku (JP)

(72) Inventors: Jin Hirosawa, Tokyo (JP); Kayoko Miyazaki, Tokyo (JP); Arihiro Takeda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 118 days.

(21) Appl. No.: 15/360,097

(22) Filed: Nov. 23, 2016

(65) Prior Publication Data

US 2017/0153492 A1    Jun. 1, 2017

(30) Foreign Application Priority Data

Jan. 27, 2015   (JP) ................................. 2015-231994

(51) Int. Cl.
*G02F 1/335* (2006.01)
*G02F 1/1335* (2006.01)

(52) U.S. Cl.
CPC .. *G02F 1/133512* (2013.01); *G02F 1/133514* (2013.01)

(58) Field of Classification Search
CPC combination set(s) only.
See application file for complete search history.

(56) References Cited

U.S. PATENT DOCUMENTS

2010/0208178 A1* 8/2010 Hayano ............. G02F 1/133512
349/106
2013/0342927 A1   12/2013 Hino et al.
2015/0287744 A1* 10/2015 Oh .................... H01L 27/127
257/72

FOREIGN PATENT DOCUMENTS

JP         5327396        10/2013
WO   WO 2013/008679 A1    1/2013

* cited by examiner

*Primary Examiner* — Nimeshkumar Patel
*Assistant Examiner* — Jacob R Stern
(74) *Attorney, Agent, or Firm* — Oblon, McClelland, Maier & Neustadt, L.L.P.

(57) ABSTRACT

According to one embodiment, a display device comprises a first substrate including a gate line extending in the first direction, and a source line extending in a second direction, and a second substrate opposed to the first substrate. The second substrate includes a first light-blocking layer which opposed to the gate line, and a second light-blocking layer which opposed to the source line. Wherein, a subpixel is formed at a position defined by the gate line and the source line, and the color layer has a first width in the first direction, the first width is greater than a width of the subpixel, and the color layer has a lager width than the first width at a overlapping position on the first light-blocking layer.

11 Claims, 10 Drawing Sheets

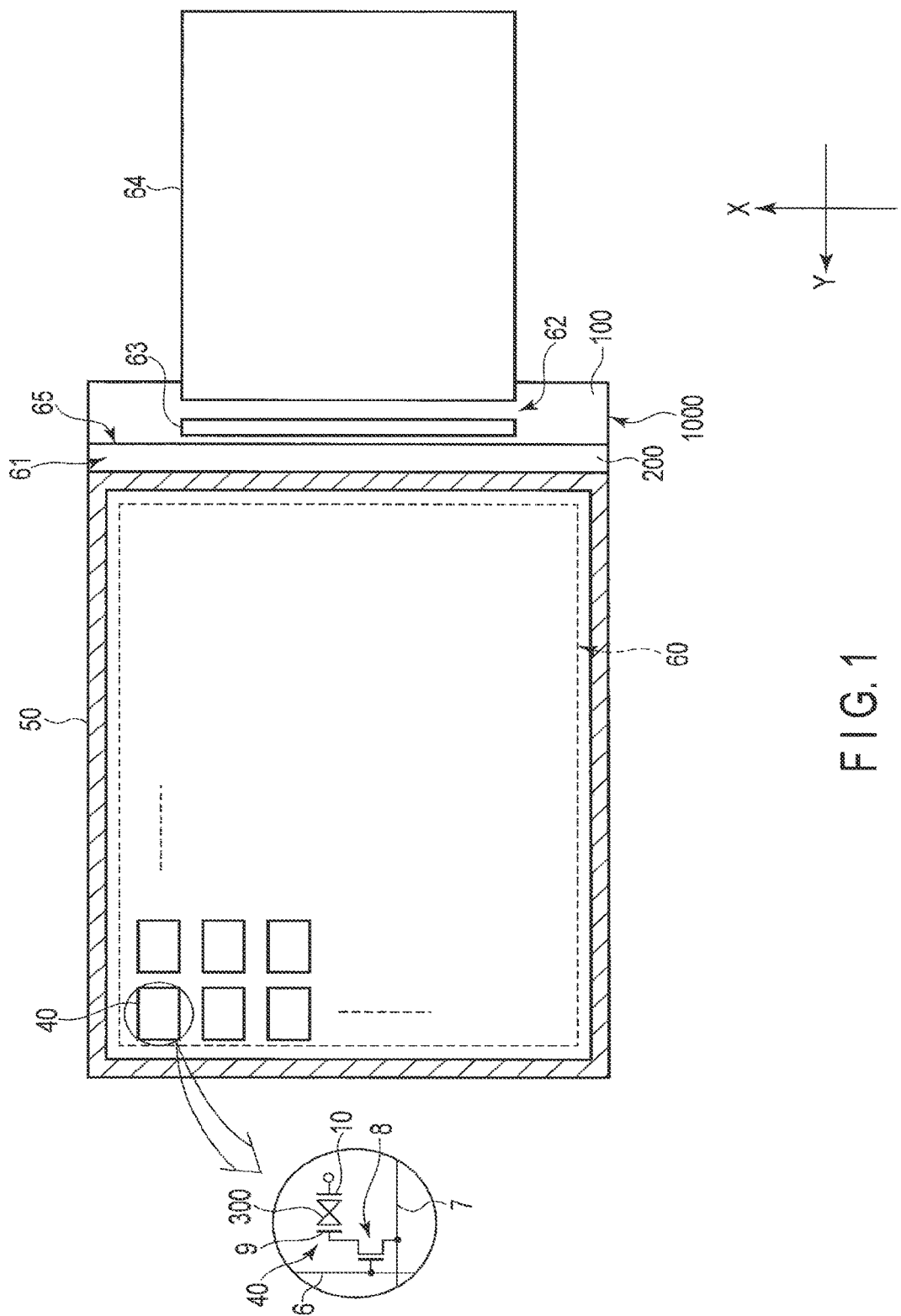
F I G. 1

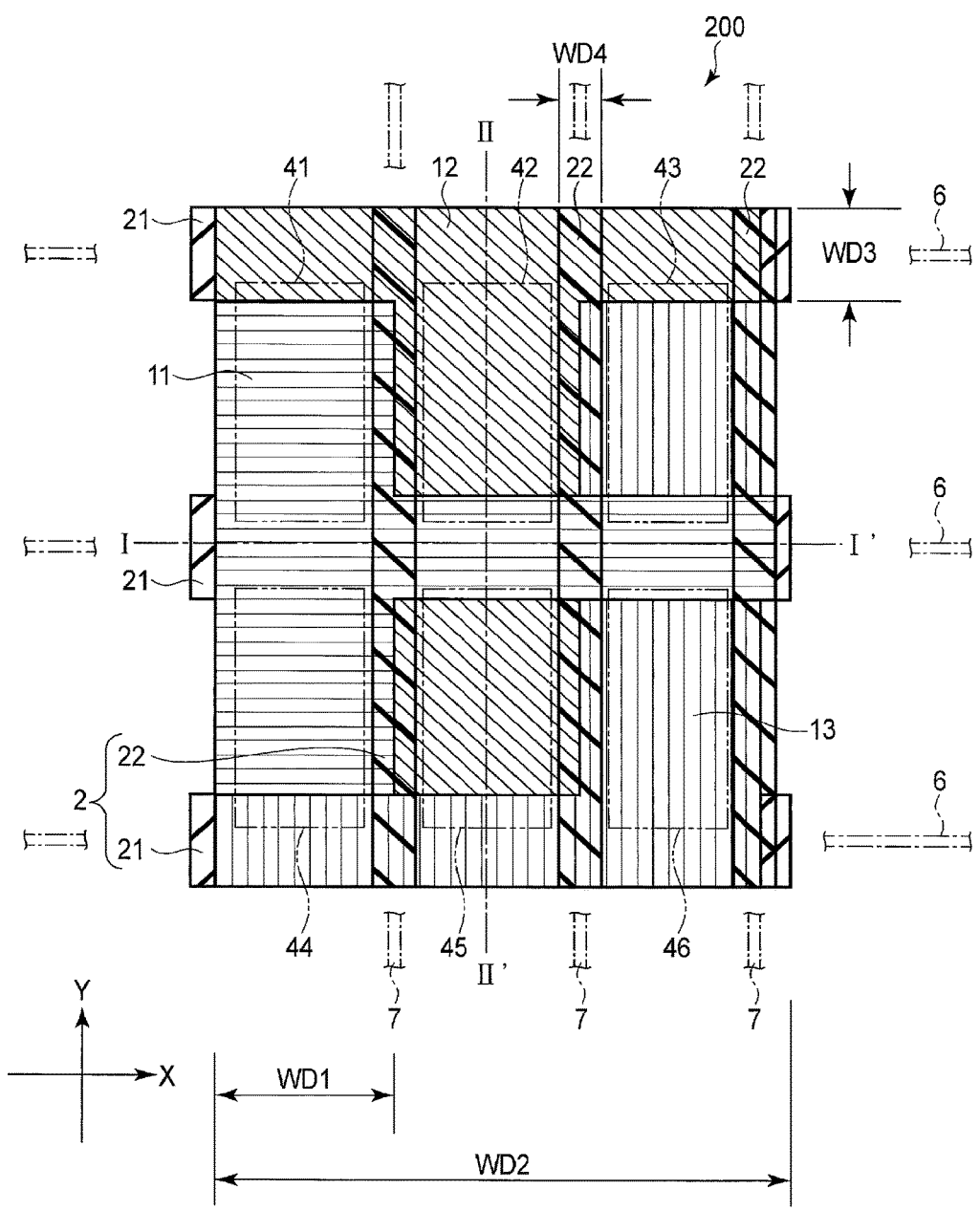
F I G. 3

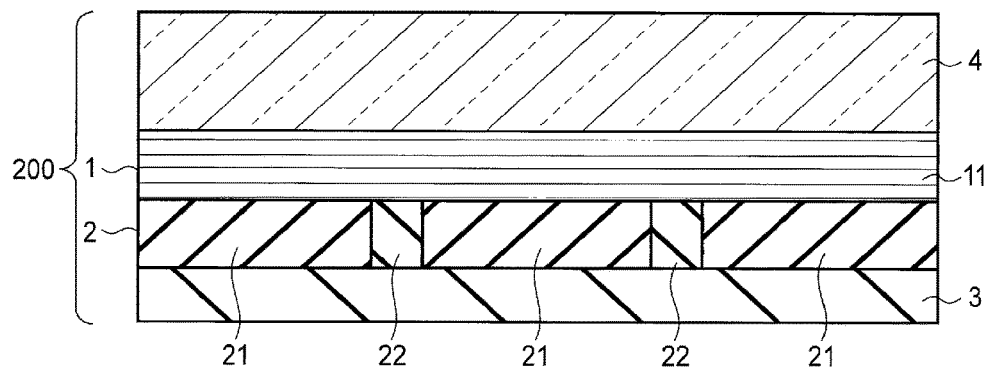
F I G. 4
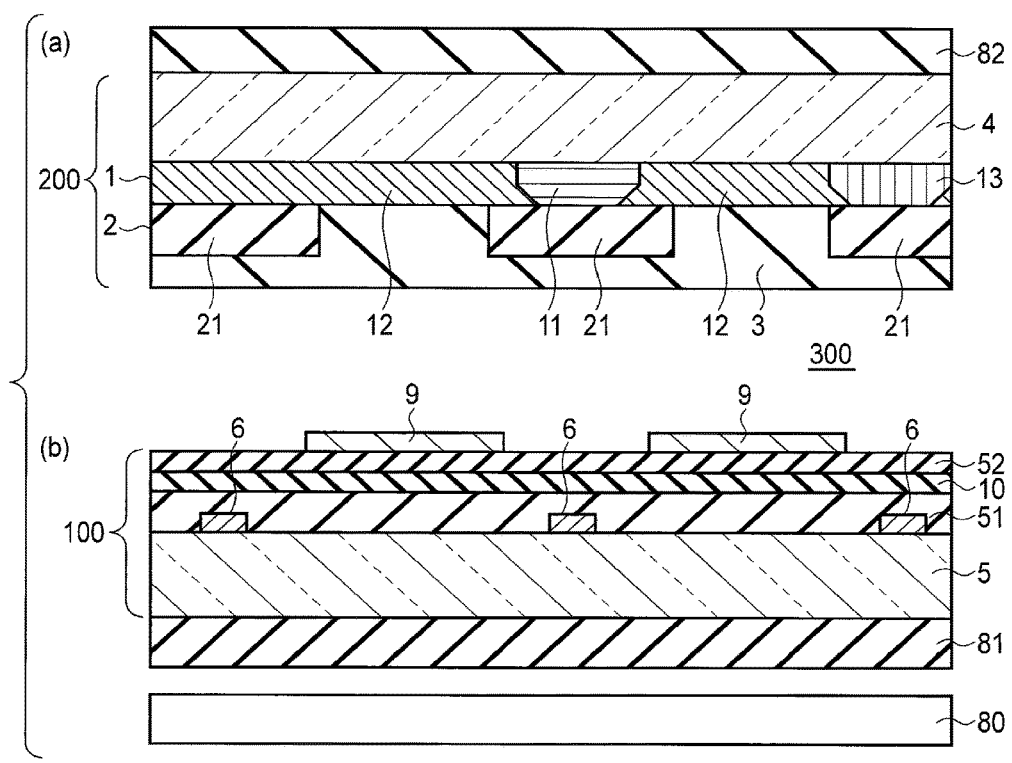
F I G. 5

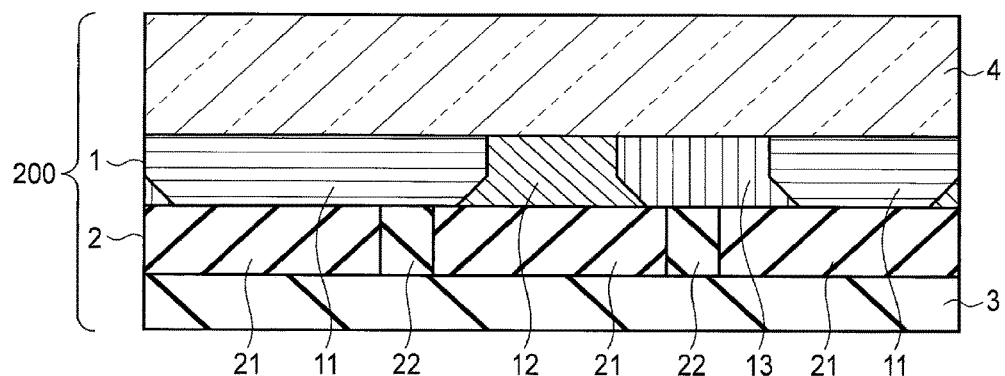
F I G. 10
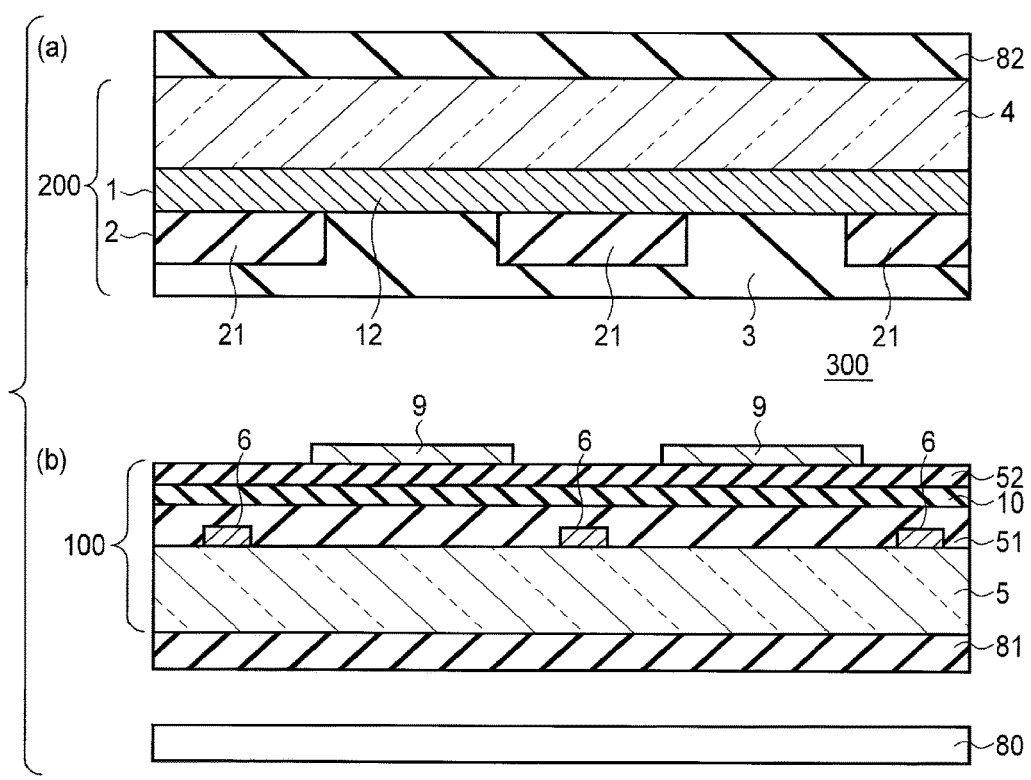
F I G. 11

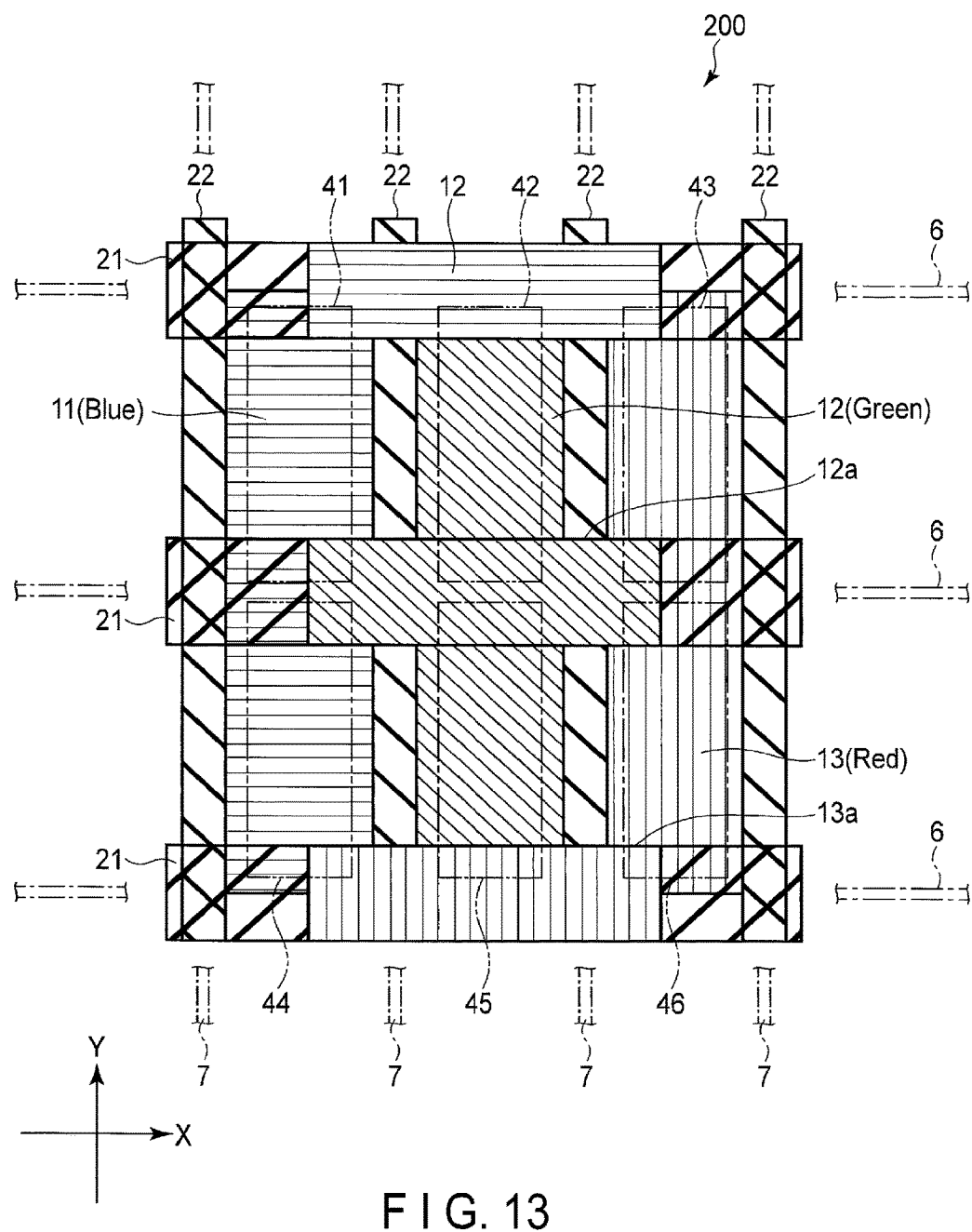
F I G. 13

DISPLAY DEVICE

CROSS-REFERENCE TO RELATED APPLICATIONS

This application is based upon and claims the benefit of priority from Japanese Patent Application No. 2015-231994, filed Nov. 27, 2015, the entire contents of which are incorporated herein by reference.

FIELD

Embodiments described herein relate generally to a display device and a color filter substrate of a display device.

BACKGROUND

Flat-panel display devices such as liquid crystal display devices and organic electroluminescent (EL) display devices are used in various fields. As an example, there is a liquid crystal display comprising a light-blocking layer formed in the shape of a lattice. These days, there is increasing demand for a technique of preventing, when external light enters from the outside, coloring of the reflected light of the external light. In particular, there is increasing demand for a technique of preventing coloring of reflected light which is reflected off the material of the light-blocking layer or reflected light which is reflected off electrodes formed on the upper surface of the substrate.

There is a literature which discloses a liquid crystal display device comprising a reflection control layer only in the rim of a non-display area located around a display area.

BRIEF DESCRIPTION OF THE DRAWINGS

FIG. 1 is a schematic view of a display panel 1000 which is applicable to a display device of the present embodiment.

FIG. 3 is a plan view of a part of a second substrate 200 of a first embodiment.

FIG. 4 is a sectional view of a part of the second substrate 200 taken along line I-I' of FIG. 3.

FIG. 5 is a sectional view of a part of the display panel 1000 taken along line II-II' of FIG. 3.

FIG. 10 is a sectional view of a part of the second substrate 200 along line V-V' of FIG. 8.

FIG. 11 is a sectional view of a part of a display panel 1000 along line VI-VI' of FIG. 8.

FIG. 13 is a plan view of a part of a second substrate 200 of a fourth embodiment.

DETAILED DESCRIPTION

Figure 2:
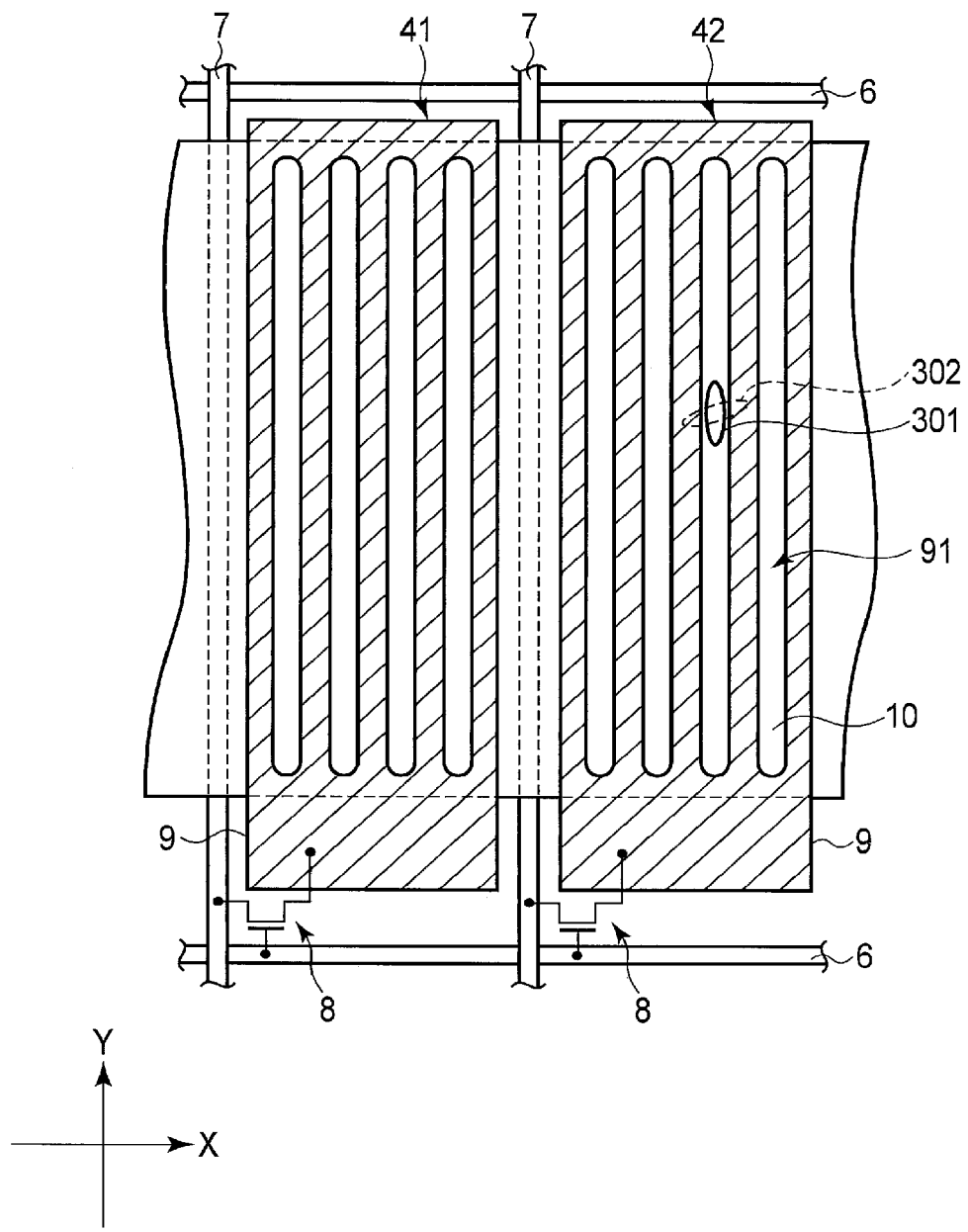
FIG. 2 is a schematic plan view of a pixel structure of a first substrate 100 viewed from a second substrate 200 side.

Various embodiments will be described hereinafter with reference to the accompanying drawings.

In general, according to one embodiment, a display device and a color filter substrate of a display device can prevent coloring of reflected light reflected which is reflected off a display panel.

According to an embodiment of the present disclosure, a display device comprises: a first substrate; a light-blocking layer including a first light-blocking layer formed on the first substrate, extending in a first direction, and separately arranged in a second direction crossing the first direction, and a second light-blocking layer formed on the first substrate, extending in the second direction, and separately arranged in the first direction crossing the second direction; and a color layer extending in the first direction and the second direction and overlapping the light-blocking layer, wherein the color layer is formed between the first substrate and the light-blocking layer, the color layer has a first width in the first direction between the second light-blocking layers separately arranged in the first direction, and the color layer has a width different from the first width in a position where the color layer overlaps the first light-blocking layer.

An embodiment will further be described with reference to the drawings.

EMBODIMENTS

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a schematic view of a display panel 1000 which is applicable to a display device of the present embodiment. In the following, a liquid crystal display device will be described as an example of the display device.

FIG. 1 is a plan view of the display panel 1000 in an X-Y plane defined by two crossing directions, namely, a first direction X and a second direction Y. Note that the first direction X and the second direction Y may, although orthogonal to each other in the embodiment, cross each other at an angle other than an angle of 90°.

The display panel 1000 is an active-matrix liquid crystal display panel and comprises a first substrate 100, a second substrate 200 opposed to the first substrate 100, and a liquid crystal layer 300 held between the first substrate 100 and the second substrate 200. In a state where a predetermined cell gap is formed between the first substrate 100 and the second substrate 200, the first substrate 100 and the second substrate 200 are attached to each other with a sealing member 50. In the cell gap between the first substrate 100 and the second substrate 200, the liquid crystal display 300 is held within an area surrounded by the sealing member 50.

The display panel 1000 comprises a display area 60 which displays an image within the are surrounded by the sealing member 50, and a non-display area 61 which is formed outside the display area 60 and does not display an image. The display area 60 is composed of a matrix of a plurality of subpixels 40.

The first substrate 100 comprises a gate line 6 which extends in the first direction X, a source line 7 which extends in the second direction Y crossing the second direction X, a switching element 8 which is electrically connected to the gate line 6 and the source line 7 in each subpixel in the display area 60, a pixel electrode 9 which is connected to the switching element in each subpixel, and the like. A common electrode 10 of the common potential is provided in the first substrate 100 or the second substrate 200 and is opposed to some of the pixel electrodes 9. Note that the gate line 6 and the source line 7 are not necessarily straight but may be covered or be partly branched.

Signal supply sources necessary for driving the display panel 1000 such as a driving IC chip 63 and a flexible printed circuit (FPC) 64 are provided in the non-display area 61. These signal supply sources are mounted on a mounting portion 62 of the first substrate 100 which extends out with respect to a substrate end portion 65 of the second substrate 200.

Note that, although detailed description of the structure of the display panel 1000 will be omitted, the display panel 1000 has a structure conforming to a display mode using a longitudinal electric field, a lateral electric field, an oblique electric field, or the like.

FIG. 2 is a schematic plan view of the pixel structure of the first substrate 100 viewed from the second substrate 200 side. Here, the pixel structure conforming to a display mode using a lateral electric field, namely, an FFS mode will be described as an example. In the drawing, only the main parts necessary for the explanation are illustrated.

The gate lines 6 extend in the first direction X and are arranged in the second direction Y crossing the first direction X separately from each other. The source lines 7 extend in the second direction Y and are arranged in the first direction X separately from each other. The gate lines 6 and the source lines 7 cross each other, respectively. A first subpixel 41 and a second subpixel 42 are adjacent to each other in the first direction X.

The common electrode 10 extends in the first direction X, is provided in the first subpixel 41 and the second subpixel 42, and is commonly provided across a plurality of subpixels arranged side by side in the first direction X. Further, although not shown in the drawing, the common electrode 10 may be commonly provided across a plurality of subpixels arranged side by side in the second direction Y.

In each of the first subpixel 41 and the second subpixel 42, the switching element 8 and the pixel electrode 9 connected to the switching elements 8 are disposed. The switching element 8 is formed in proximity to the intersection of the gate line 6 and the source line 7 and is electrically connected to the gate line 6 and the source line 7. The switching element 8 is, for example, a thin-film transistor (TFT).

The pixel electrode 9 is opposed to the common electrode 10. The pixel electrode 9 is formed in the shape corresponding to the shape of each subpixel. The pixel electrode 9 comprises a plurality of slits 91. In the example shown in the drawing, the slits 91 extend in the second direction Y, respectively.

FIG. 3 is a plan view of a part of the second substrate 200 of the first embodiment. Here, the first direction X and the second direction Y are orthogonal to each other.

In each embodiment, the direction from the first substrate 100 to the second substrate 200 is the upper direction, and the direction from the second substrate 200 to the first substrate 100 is the lower direction.

A first subpixel 41, a second subpixel 42, and a third subpixel 43 are arranged in this order in the first direction X. In the example shown in the drawing, the first subpixel 41, the second subpixel 42, and the third subpixel 43 are formed in the same size as each other and are configured to display different colors from each other. As an example, these three subpixels constitute one pixel 400. The pixel 400 is the minimum unit constituting a color pixel configured to display a color image in the display area 60.

Further, a fourth subpixel 44, a fifth subpixel 45, and a sixth subpixel 46 are disposed. The fourth subpixel 44 is adjacent to the first subpixel 41 in the second direction Y, the fifth subpixel 45 is adjacent to the second subpixel 42 in the second direction Y, and the sixth subpixel 46 is adjacent to the third subpixel 43 in the second direction Y. In a manner similar to those of the first subpixel 41, the second subpixel 42, and the third subpixel 43, the fourth subpixel 44, the fifth subpixel 45 and the sixth subpixel 46 are formed in the same size as each other and are configured to display different colors from each other. In the example shown in the drawing, the first subpixel 41 and the fourth subpixel 44 display the same color as each other, the second subpixel 42 and the fifth subpixel 45 display the same color as each other, and the third subpixel 43 and the sixth subpixel 46 display the same color as each other.

At the boundary of the subpixels, a light-blocking layer 2 is formed. The light-blocking layer 2 comprises a first light-blocking layer 21 which extends in the first direction X, and a second light-blocking layer 22 which extends in the second direction Y. For example, the first light-blocking layer 21 is provided above the gate line 6 shown in FIG. 2, and the second light-blocking layer 22 is provided above the source line 7 shown in FIG. 2, and in this way, a lattice of the first light-blocking layer 21 and the second light-blocking layer 22 is formed. Each of the first subpixel 41 to the sixth subpixel 46 is defined by the first light-blocking layer 21 and the second light-blocking layer 22. That is, one of the first light-blocking layers 21 extends in the first direction X between the first subpixel 41 to the third subpixel 43 and the fourth subpixel 44 to the sixth subpixel 46, which are adjacent to the first subpixel 41 to the third subpixel 43 in the second direction Y. Further, the second light-blocking layers 22 extend in the second direction Y between the first subpixel 41 and the second subpixel 42, between the second subpixel 42 and the third subpixel 43, between the fourth subpixel 44 and the fifth subpixel 45, and between the fifth subpixel 45 and the sixth subpixel 46, respectively. The width of the first light-blocking layer 21 in the second direction Y is greater than the width of the second light-blocking layer 22 in the first direction X.

A color layer 1 comprises a first color layer 11, a second color layer 12, and a third color layer 13.

The first color layer 11 is formed in the first subpixel 41 and the fourth subpixel 44. Further, the first color layer 11 includes a portion (an extension portion) which extends in the first direction X between the first subpixel 41 to the third subpixel 43 and the fourth subpixel 44 to the sixth subpixel 46. In the example shown in the drawing, the width of the first-directional extension portion of the first color layer 11 is about the same as the width of the first light-blocking layer 21. Note that the width in the second direction Y of the first-directional extension portion may be less than the width in the second direction Y of the first light-blocking layer 21.

The second color layer 12 is formed in the second subpixel 42 and the fifth subpixel 45. The second color layer 12 formed in the second subpixel 42 includes a portion (an extension portion) which extends in the first direction X on the side opposite to the fifth subpixel 45 side. The second color layer 12 provided in the fifth subpixel 45 is formed in the shape of an island. The width of the first-directional extension portion of the second color layer 12 is about the same as the width in the second direction Y of the first light-blocking layer 21. Note that the width in the second direction Y of the first-directional extension portion may be less than the width in the second direction Y of the first light-blocking layer 21.

The third color layer 13 is formed in the third subpixel 43 and the sixth subpixel 46. The third color layer 13 provided in the third subpixel 43 is formed in the shape of an island. The third color layer 13 formed in the sixth subpixel 46 includes a portion (an extension portion) which extends in the first direction X on the side opposite to the third subpixel 43 side. The width in the second direction Y of the first-directional extension portion of the third color layer 13 is about the same as the width in the second direction Y of the first light-blocking layer 21. Note that the width in the second direction Y of the first-directional extension portion may be less than the width in the second direction Y of the first light-blocking layer 21.

The first-directional extension portions of the first color layer 11, the second color layer 12, and the third color layer 13 extend above the different light-blocking layers 21, respectively, without overlapping each other. That is, the first light-blocking layer 21 formed below the first color layer 11, the first light-blocking layer 21 formed below the second color layer 12, and the first light-blocking layer 21 formed below the third color layer 12 are individually formed.

Each of the first color layer 11, the second color layer 12, and the third color layer 13 is a color layer corresponding to any one of red, green and blue. For example, the first color layer 11 is a blue layer, the second color layer 12 is a green layer, and the third color layer 13 is a red layer.

Note that a fourth color layer as a white (or transparent) layer may be further provided. In that case, the first color layer 11 may be provided in the first subpixel 41, and the fourth color layer may be provided in the fourth subpixel 44. Further, the first-directional extension portion may be formed of the fourth color layer.

The first light-blocking layers 21 are formed below the first color layer 11, the second color layer 12, and the third color layer 13, respectively. The second light-blocking layers 22 overlap the adjacent end portions of the first color layer 11, the second color layer 12, and the third color layer 13.

The first-directional extension portions of the first color layer 11, the second color layer 12, and the third color layer 13 are not necessarily formed in such a manner that all the colors are evenly provided. For example, the area of the blue color layer may be greater than those of the other color layers.

Further, although the second light-blocking layer 22 is provided above the color layer 1 in the example shown in the drawing, the second light-blocking layer 22 may be provided below the color layer 1.

As described above, the color layer 1 (11, 12 or 13) has a first width WD 1 in the first direction X in the position corresponding to each subpixel. Further, the first width WD1 is greater than the first-directional width in the first direction X of each subpixel. Still further, each color layer in a position where the each color layer overlaps the first light-blocking layer 21 has a second width WD2 which is different from first width WD1. The same also applies to the other embodiments, which will be described later.

Further, a second-directional width WD3 in the second direction Y of the first light-blocking layer 21 is greater than a first-directional width WD4 in the first direction X of the second light-blocking layer 22.

FIG. 4 is a sectional view of a part of the second substrate 200 taken along line I-I' of FIG. 3.

The second substrate 200 is formed of a transparent substrate such as a glass substrate, namely, a second insulating substrate 4. The second substrate 200 comprises the color layer 1, the light-blocking layer 2, and an overcoat layer 3 and the like below the second insulating substrate 4.

In FIG. 4, the color layer 1 only includes the first color layer 11 which is formed of a blue-colored resin material.

The light-blocking layer 2 includes the first light-blocking layer 21 and the second light-blocking layer 22 and is formed of a black resin material or a light-blocking metal material. In the example shown in the drawing, the first light-blocking layer 21 and the second light-blocking layer 22 are formed below the color layer 1 as the same single layer.

Note that the second light-blocking layer 22 may be formed between the second insulating substrate 4 and the color layer 1.

The overcoat layer 3 is formed below the color layer 1 and the light-blocking layer 2. The overcoat layer 3 flattens the unevenness of the color layer 1 and the light-blocking layer 2. The overcoat layer 3 is formed of a transparent resin material. Below the overcoat layer 3, a second alignment film (not shown in the drawing) is formed. For example, the second alignment film is formed of a material having a horizontal alignment property and is provided on a surface of the second substrate 200 which is in contact with the liquid crystal display 300.

Note that the overcoat layer 3 may be formed between the color layer 1 and the light-blocking layer 2.

FIG. 5 is a sectional view of a par of the display panel 1000 taken along line II-II' of FIG. 3.

The first substrate 100 is formed of a transparent substrate such as a glass substrate, namely, a first insulating substrate 5. The first substrate 100 comprises the common electrode 10, the pixel electrode 9, the switching element 8 (not shown in the drawing), and the like above the first insulating substrate 5.

The common electrode 10 is formed above a first insulating layer 51. The common electrode 10 is formed of a transparent conductive material such as indium tin oxide (ITO) or indium zinc oxide (IZO). The common electrode 10 is covered with a second insulating layer 52.

The pixel electrode 9 is formed above the second insulating layer 52 and is opposed to the common electrode 10. Note that, although the pixel electrode 9 comprises the slits 91 (see FIG. 2) elongated in the second direction Y, detailed illustration thereof is omitted. The pixel electrode 9 is formed of a transparent conductive material such as indium tin oxide (ITO) or indium zinc oxide (IZO). The pixel electrode 9 is covered with a first alignment film (shown in the drawing). The first alignment film is also formed above a part of the second insulating layer 52 where the pixel electrode 9 is not formed. For example, the first alignment film is formed of a material having a horizontal alignment property and is provided on a surface of the first substrate 100 which is in contact with the liquid crystal display 300.

The second substrate 200 is formed of a transparent substrate such as a glass substrate, namely, the second insulating substrate 4. The second substrate 200 comprises the color layer 1, the light-blocking layer 2, and the overcoat layer 3 and the like below the second insulating substrate 4.

The color layer 1 includes the first color layer 11 formed of a blue-colored resin material, the second color layer 12 formed of a green-colored resin material, and the third color layer 13 formed of a red-colored resin material.

The light-blocking layer 2 is formed of a black resin material or a light-blocking metal material. In the example shown in the drawing, the light-blocking layer 2 is formed between the subpixels adjacent to each other in the second direction Y. Each subpixel is provided with one of the first color layer 11, the second color layer 12, and the third color layer 13, which correspond to different colors, respectively. The light-blocking layer 2 overlaps the first color layer 11, the second layer 12, and the third color layer 13.

The overcoat layer 3 is formed below the color layer 1 and the light-blocking layer 2. The overcoat layer 3 flattens the unevenness of the color layer 1 and the light-blocking layer 2. The overcoat layer 3 is formed of a transparent resin material. Below the overcoat layer 3, the second alignment film (not shown in the drawing) is formed. For example, the second alignment film is formed of a material having a horizontal alignment property and is provided on a surface of the second substrate 200 which is in contact with the liquid crystal display 300.

Note that the overcoat layer 3 may be formed between the color layer 1 and the light-blocking layer 2.

The above-described second substrate 200 is manufactured, for example, through the following process. On the second insulating substrate 4, after the first color layer 11, the second color layer 12, and the third color layer 13 are formed by means of patterning, the lattice-shaped light-blocking layer 2 is formed. Subsequently, the overcoat layer 3 and the second alignment film are formed in this order, and then the second substrate 200 is manufactured.

The first substrate 100 and the second substrate 200 are arranged such that the first alignment film and the second alignment film are opposed to each other. At this time, a predetermined cell gap is formed between the first substrate 100 and the second substrate 200 by a spacer (not shown in the drawing). In a state where the cell gap is formed by the spacer, the first substrate 100 and the second substrate 200 are attached to each other with the sealing member 50 (see FIG. 1). The liquid crystal layer 300 is formed of a liquid crystal composition which contains liquid crystal molecules and is sealed in the cell gap formed between the first alignment film of the first substrate 100 and the second alignment film of the second substrate 200.

In the display panel 1000 which has the above-described structure, a backlight 80 is provided on the lower side. Note that the backlight 80 can have various structures and thus detailed description thereof will be omitted.

Further, a first optical element 81 including a first polarizer is provided on the lower side of the first substrate 100. A second optical element 82 including a second polarizer is provided on the upper side of the second substrate 200.

According to the first embodiment, since at least a part of the first light-blocking layer 21 and the second light-blocking layer 22, which define each subpixel, are stacked below the color layer 1, external light which enters the display panel 1000 may be transmitted thorough the color layer 1 and be reflected off the light-blocking layer 2. Consequently, the reflected external light may be visually recognized. Therefore, the color of the reflected light varies depending on the color (proportions of blue, green, red and the like) of the color layer 1 through which the light is transmitted. It is possible to freely design the color of the reflected external light by appropriately choosing the color (proportions of blue, green, red and the like) of the color layer 1 which overlaps the light-blocking layer 2. According to the design based on the above-described principle, it becomes possible to prevent undesirable coloring of the display panel 1000 regardless of the material of the light-blocking layer, the electrodes formed on the upper surface of the substrate and the like. Note that the change in the color of the reflected light will be described in the third embodiment.

Further, in the light-blocking layer 2, the width of the first light-blocking layer 21 is greater than the width of the second light-blocking layer 22. Therefore, the influence of the color of the light reflected off the first light-blocking layer 21 and transmitted thorough the color layer 1 is greater than the influence of the color of the light reflected off the second light-blocking layer 22 and transmitted through the color layer 1. Consequently, it is possible to effectively control the coloring of the reflected light by adjusting the proportions of the colors above the first light-blocking layer 21.

Still further, when at least the first light-blocking layer 21 is stacked below the color layer 1, the proportion of the light which is directly reflected off the light-blocking layer 2 can be reduced, and thus the coloring of the light reflected off the material of the light-blocking layer 2 can be prevented.

Next, the second embodiment will be described.

In the second embodiment, features different from those of the first embodiment will be mainly described, and features the same as those of the first embodiment will be appropriately omitted.

Figure 6:
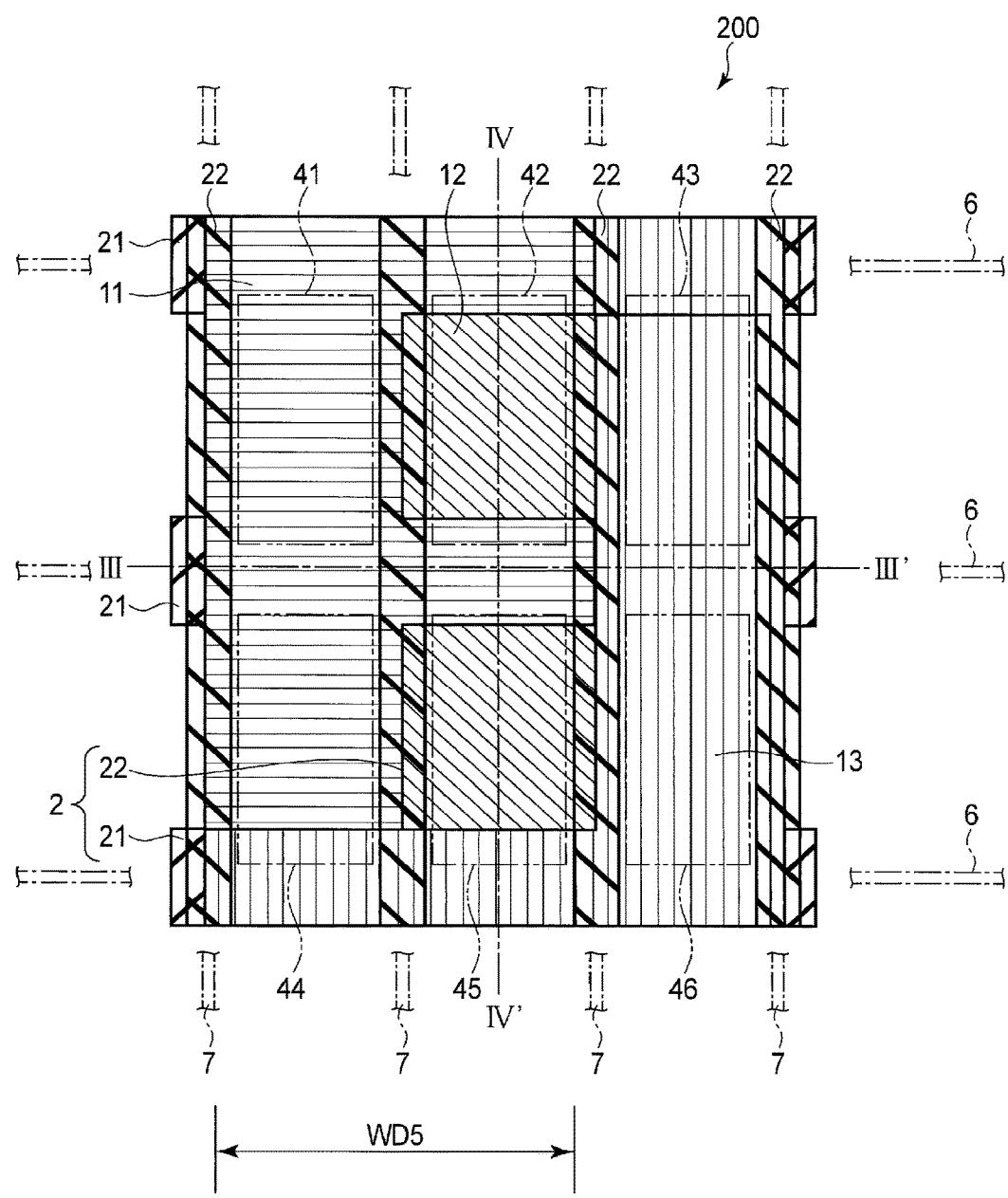
FIG. 6 is a plan view of a part of a second substrate 200 of a second embodiment.

FIG. 6 is a plan view of a part of a second substrate 200 of the second embodiment.

A first subpixel 41, a second subpixel 42, and a third subpixel 43 are arranged in this order in the first direction X. In the example shown in the drawing, the first subpixel 41, the second subpixel 42, and the third subpixel 43 are formed in the same size as each other and are configured to display different colors from each other.

Further, a fourth subpixel 44, a fifth subpixel 45, and a sixth subpixel 46 are disposed. The fourth subpixel 44 is adjacent to the first subpixel 41 in the second direction Y, the fifth subpixel 45 is adjacent to the second subpixel 42 in the second direction Y, and the sixth subpixel 46 is adjacent to the third subpixel 43 in the second direction Y. In a manner similar to those of the first subpixel 41, the second subpixel 42, and the third subpixel 43, the fourth subpixel 44, the fifth subpixel 45, and the sixth subpixel 46 are formed in the same size as each other and are configured to display different colors from each other. In the example shown in the drawing, the first subpixel 41 and the fourth subpixel 44 display the same color as each other, the second subpixel 42 and the fifth subpixel 45 display the same color as each other, and the third subpixel 43 and the sixth subpixel 46 display the same color as each other.

At the boundary of the subpixels, a light-blocking layer 2 is formed. The light-blocking layer 2 comprises a first light-blocking layer 21 which extends in the first direction X and a second light-blocking layer 22 which extends in the second direction Y. For example, the first light-blocking layer 21 is provided above the gate line 6 shown in FIG. 2 and the second light-blocking layer 22 is provided above the source line 7 shown in FIG. 2, and in this way a lattice of the first light-blocking layer 21 and the second light-blocking layer 22 is formed. Each of the first subpixel 41 to the sixth subpixel 46 is defined by the first light-blocking layer 21 and the second light-blocking layer 22. That is, one of the first light-blocking layers 21 extends in the first direction X between the first subpixel 41 to the third subpixel 43 and the fourth subpixel 44 to the sixth subpixel 46, which are adjacent to the first subpixel 41 to the third subpixel 43, respectively, in the second direction Y. Further, the second light-blocking layers 22 extend in the second direction Y between the first subpixel 41 and the second subpixel 42, between the second subpixel 42 and the third subpixel 43, between the fourth subpixel 44 and the fifth subpixel 45, and between the fifth subpixel 45 and the sixth subpixel 46, respectively. The width of the first light-blocking layer 21 in the second direction Y is greater than the width of the second light-blocking layer 22 in the first direction X.

A color layer 1 comprises a first color layer 11, a second color layer 12, and a third color layer 13.

The first color layer 11 is formed in the first subpixel 41 and the fourth subpixel 44. Further, the first color layer 11 includes a portion (extension portion) which extends in the first direction X between the first subpixel 41 and the second subpixel 42, and the fourth subpixel 44 and the fifth subpixel 45. In the example shown in the drawing, the width in the second direction Y of the first-directional extension portion of the first color layer 11 is about the same as the width in the second direction Y of the first light-blocking layer 21. The width in the second direction Y of the first-directional extension portion may be less than the width in the second direction Y of the first light-blocking layer 21.

The second color layer 12 is formed in the second subpixel 42 and the fifth subpixel 45 in the shape of an island. That is, the second color layer 12 does not include any extension portion which extends in the first direction X.

The third color layer 13 is formed in the third subpixel 43 and the sixth subpixel 46. The third color layer 13 provided in the third subpixel 43 and the sixth subpixel 46, extends in the second direction Y, and is formed in the shape of a stripe.

Only the first color layer 11 includes the first-directional portions. That is, the first color layer 11 has an E shape in planar view.

Each of the first color layer 11, the second color layer 12, and the third color layer 13 is a color layer corresponding to any one of red, green and blue. For example, the first color layer 11 is a blue layer, the second color layer 12 is a green layer, and the third color layer 13 is a red layer.

Note that a fourth color layer as a white (or transparent) layer may be further provided. In that case, the first color layer 11 may be formed in the first subpixel 41, and the fourth color layer may be formed in the fourth subpixel 44. Further, the first-directional extension portion may be formed of the fourth color layer.

The first light-blocking layers 21 are formed below the first color layer 11, the second color layer 12, and the third color layer 13, respectively. The second light-blocking layers 22 overlap the adjacent end portions of the first color layer 11, the second color layer 12, and the third color layer 13.

Note that the above-described first-directional extension portions may not be formed only of the first color layer 11. For example, as the first-directional extension portions, blue color layers and red color layers may be alternately arranged. That is, one of the first color layer 11 and the third color layer 13 has a width WD5 greater than the first width WD1 (see FIG. 3) in a position where the one of the first color layer 11 and the third color layer 13 overlaps the first light-blocking layer 21. FIG. 6 shows the width WD5 of the first color layer 11.

Further, although the second light-blocking layer 22 is arranged below the color layer 1 in the example of shown in the drawing, the second light-blocking layer 22 may be arranged above the color layer 1.

Figure 7:
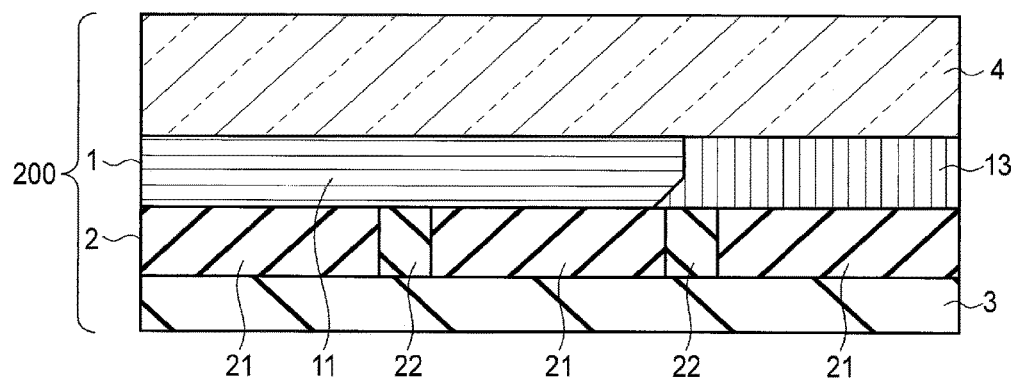
FIG. 7 is a sectional view of a part of the second substrate 200 taken along line III-III' of FIG. 6.

FIG. 7 is a sectional view of a part of the second substrate 200 taken along line III-III' of FIG. 6.

The second substrate 200 is formed of a transparent substrate such as a glass substrate, namely, a second insulating substrate 4. The second substrate 200 comprises the color layer 1, the light-blocking layer 2, and an overcoat layer 3 and the like below the second insulating substrate 4.

In FIG. 7, the color layer 1 includes the first color layer 11 formed of a blue-colored resin material, and the third color layer 13 formed of a red-colored resin material.

The light-blocking layer 2 includes the first light-blocking layer 21 and the second light-blocking layer 22 and is formed of a black resin material or a light-blocking metal material. In the example shown in the drawing, the first light-blocking layer 21 and the second light-blocking layer 22 are formed below the color layer 1 as the same single layer.

Note that the second light-blocking layer 22 may be formed between the second insulating substrate 4 and the color layer 1.

The overcoat layer 3 is formed below the color layer 1 and the light-blocking layer 2. The overcoat layer 3 flattens the unevenness of the color layer 1 and the light-blocking layer 2. The overcoat layer 3 is formed of a transparent resin material. Below the overcoat layer 3, a second alignment film (not shown in the drawing) is formed. For example, the second alignment film is formed of a material having a horizontal alignment property and is provided on a surface of the second substrate 200 which is in contact with the liquid crystal display 300.

Note that the overcoat layer 3 may be formed between the color layer 1 and the light-blocking layer 2.

Figure 8:
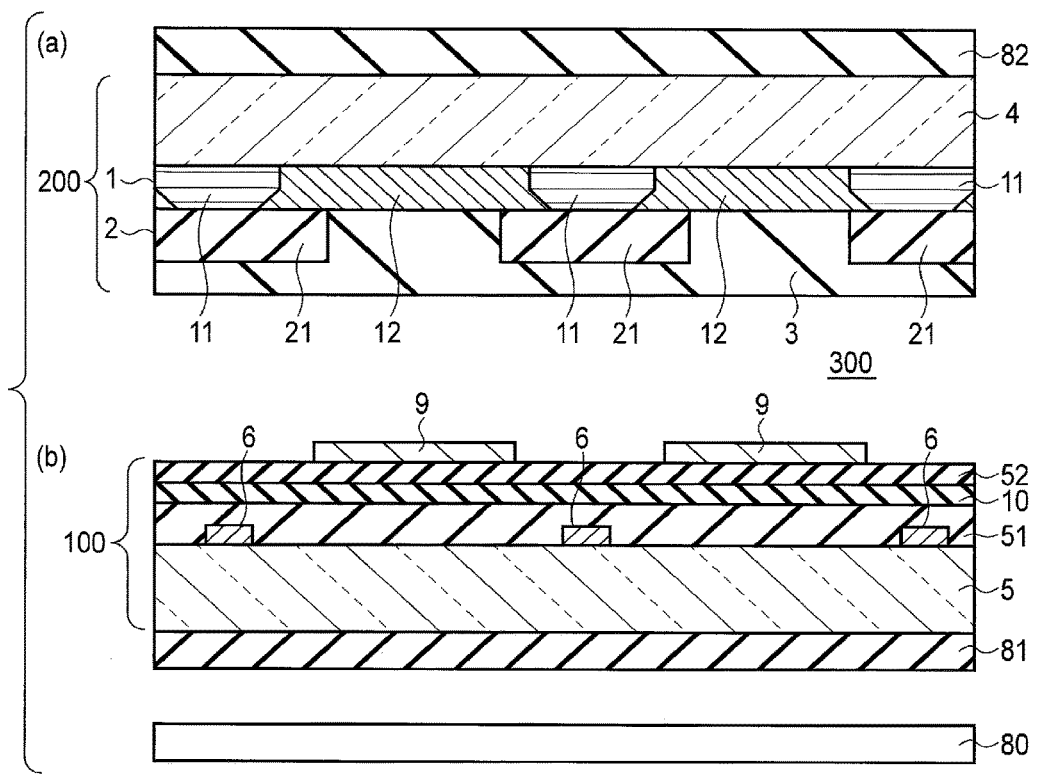
FIG. 8 is a sectional view of a display panel 1000 taken along line IV-IV' of FIG. 6.

FIG. 8 is a sectional view of a part of a display panel 1000 taken along line IV-IV' of FIG. 6.

The first substrate 100 is formed of a transparent substrate such as a glass substrate, namely, a first insulating substrate 5. The first substrate 100 comprises a common electrode 10, a pixel electrode 9, a switching element 8 (not shown in the drawing), and the like above the first insulating substrate 5.

The common electrode 10 is formed above the first insulating layer 51. The common electrode 10 is formed of a transparent conductive material such as indium tin oxide (ITO) or indium zinc oxide (IZO). The common electrode 10 is covered with a second insulating layer 52.

The pixel electrode 9 is formed above the second insulating layer 52 and is opposed to the common electrode 10. Note that, although the pixel electrode 9 comprises slits 91 (see FIG. 2) elongated in the second direction Y, detailed illustration is omitted. The pixel electrode 9 is formed of a transparent conductive material such as indium tin oxide (ITO) or indium zinc oxide (IZO). The pixel electrode 9 is covered with a first alignment film (not shown in the drawing). The first alignment film is also formed above a part of the second insulating layer 52 where the pixel electrode 9 is not formed. For example, the first alignment film is formed of a material having a horizontal alignment property and is provided on a surface of the first substrate 100 which is in contact with the liquid crystal display 300.

The second substrate 200 is formed of a transparent substrate such as a glass substrate, namely, the second insulating substrate 4. The second substrate 200 comprises the color layer 1, the light-blocking layer 2, and the overcoat layer 3 and the like below the second insulating substrate 4.

The color layer 1 includes the first color layer 11 formed of a blue-colored resin material, and the second color layer 12 formed of a green-colored resin material.

The light-blocking layer 2 is formed of a black resin material or a light-blocking metal material. In the example shown in FIG. 8, the light-blocking layer 2 is formed between the subpixels adjacent to each other in the second direction Y. The light-blocking layer 2 overlaps the first color layer 11.

The overcoat layer 3 is formed below the color layer 1 and the light-blocking layer 2. The overcoat layer 3 flattens the unevenness of the color layer 1 and the light-blocking layer 2. The overcoat layer 3 is formed of a transparent resin material. Below the overcoat layer 3, the second alignment film (not shown in the drawing) is formed. For example, the second alignment film is formed of a material having horizontal alignment property and is provided on a surface of the second substrate 200 which is in contact with the liquid crystal display 300.

Note that the overcoat layer 3 may be formed between the color layer 1 and the light-blocking layer 2.

The first substrate 100 and the second substrate 200 are arranged such that the first alignment film and the second alignment film are opposed to each other. At this time, a predetermined cell gap is formed between the first substrate 100 and the second substrate 200 by a spacer (not shown in the drawing). In a state where the cell gap is formed by the spacer, the first substrate 100 and the second substrate 200 are attached to each other with a sealing member 50 (see FIG. 1). The liquid crystal layer 300 is formed of a liquid crystal composition which contains liquid crystal molecules and is sealed in the cell gap between the first alignment film of the first substrate 100 and the second alignment film of the second substrate 200.

In the display panel 1000 which has the above-described structure, a backlight 80 is provided on the lower side. Note that the backlight 80 can have various structures and thus detailed description thereof will be omitted.

Further, a first optical element 81 including a first polarizer is provided on the lower side of the first substrate 100. A second optical element 82 including a second polarizer is provided on the upper side of the second substrate 200.

The second embodiment is different from the first embodiment in the color layer 1 which overlaps the first light-blocking layer 21. More specifically, the first color layer 11 and the third color layer 13 are formed above the same first light-blocking layer 21. Except for the above structure, the second embodiment is the same as the first embodiment.

The second embodiment can also produce the same technical effect as that produced by the first embodiment.

Next, the third embodiment will be described.

Figure 9:
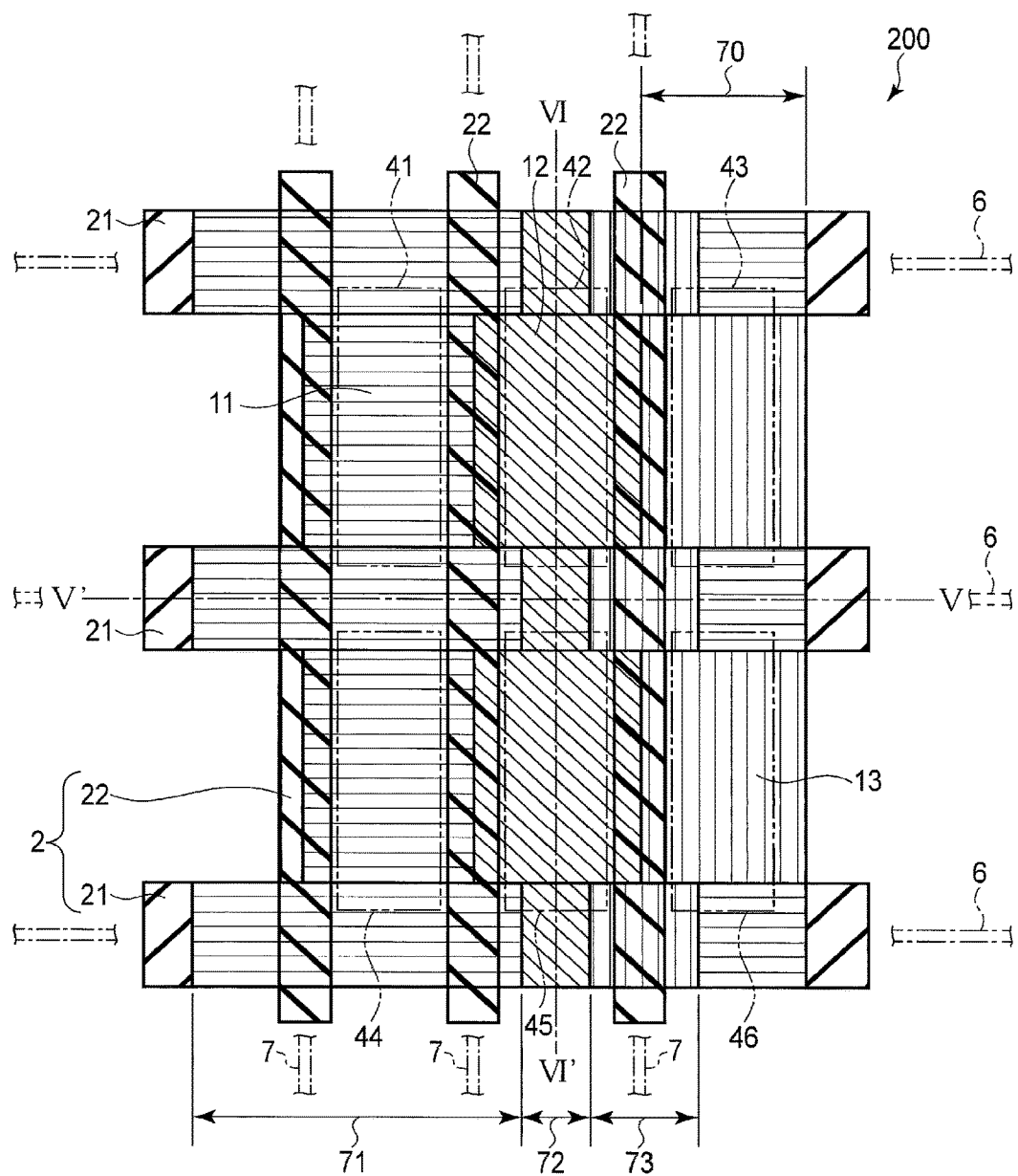
FIG. 9 is a plan view of a part of a second substrate 200 of a third embodiment.

FIG. 9 is a plan view of a part of a second substrate 200 of the third embodiment.

A first subpixel 41, a second subpixel 42, and a third subpixel 43 are arranged in this order in the first direction X. In the example shown in the drawing, the first subpixel 41, the second subpixel 42, and the third subpixel 43 are formed in the same size as each other and are configured to display different colors from each other.

Further, a fourth subpixel 44, a fifth subpixel 45, and a sixth subpixel 46 are disposed. The fourth subpixel 44 is adjacent to the first subpixel 41 in the second direction Y, the fifth subpixel 45 is adjacent to the second subpixel 42 in the second direction Y, and the sixth subpixel 46 is adjacent to the third subpixel 43 in the second direction Y. In a manner similar to those of the first subpixel 41, the second subpixel 42, and the third subpixel 43, the fourth subpixel 44, the fifth subpixel 45, and the sixth subpixel 46 are formed in the same size as each other and are configured to display different colors from each other. In the example shown in the drawing, the first subpixel 41 and the fourth subpixel 44 display the same color as each other, the second subpixel 42 and the fifth subpixel 45 display the same color as each other, and the third subpixel 43 and the sixth subpixel 46 display the same color as each other.

At the boundary of the subpixels, a light-blocking layer 2 is formed. The light-blocking layer 2 comprises a first light-blocking layer 21 which extends in the first direction X, and a second light-blocking layer 22 which extends in the second direction Y. For example, the first light-blocking layer 21 is provided above the gate line 6 shown in FIG. 2 and the second light-blocking layer 22 is provided above the source line 7 shown in FIG. 2, and in this way, a lattice of the first light-blocking layer 21 and the second light-blocking layer 22 is formed. Each of the first subpixel 41 to the sixth subpixel 46 is defined by the first light-blocking layer 21 and the second light-blocking layer 22. That is, one of the first light-blocking layers 21 extends in the first direction X between the first subpixel 41 to the third subpixel 43 and the fourth subpixel 44 to the sixth subpixel 46, which are adjacent to the first subpixel 41 to the third subpixel 43, respectively, in the second direction Y. Further, the second light-blocking layers 22 extend in the second direction Y between the first subpixel 41 and the second subpixel 42, between the second subpixel 42 and the third subpixel 43, between the fourth subpixel 44 and the fifth subpixel 45, and between the fifth subpixel 45 and the sixth subpixel 46, respectively. The width of the first light-blocking layer 21 in the second direction Y is greater than the width of the second light-blocking layer 22 in the first direction X.

A color layer 1 comprises a first color layer 11, a second color layer 12, and a third color layer 13.

The first color layer 11 is formed in the first subpixel 41 and the fourth subpixel 44. In the position corresponding to the first subpixel 41 and the fourth subpixel 44, the first color layer 11 has a first width 70 in the first direction X. Further, in a position where the first color layer 11 overlaps the first light-blocking layer 21, the first color layer 11 has a second width 71 which is greater than the first width 70 in the first direction X. In a position where the first color layer 11 overlaps the first light-blocking layer 21, the second-directional width in the second direction Y of the first color layer 11 is the same as the width in the second direction Y of the first light-blocking layer 21. Note that, in a position where the first color layer 11 overlaps the first light-blocking layer 21, the second-directional width in the second direction Y of the first color layer 11 may be less than the width in the second direction Y of the first light-blocking layer 21.

The second color layer 12 is formed in the second subpixel 42 and the fifth subpixel 45. In a manner similar to that of the first color layer 11, the second color layer 12 has the first width 70 in the first direction X in the position corresponding to the second subpixel 42 and the fifth subpixel 45. In a position where the second color layer 12 overlaps the first light-blocking layer 21, the second color layer 12 has a third width 72 which is less than the first width 70 and is less than the second width 71 in the first direction X. In a position where the second color layer 12 overlaps the first light-blocking layer 21, the second-directional width in the second direction Y of the second color layer 12 is the same as the width in the second direction Y of the first light-blocking layer 21. Note that, in a position where the second color layer 12 overlaps the first light-blocking layer 21, the second-directional width in the second direction Y of the second color layer 12 may be less than the width in the second direction Y of the first light-blocking layer 21.

The third color layer 13 is formed in the third subpixel 43 and the sixth subpixel 46. In a manner similar to those of the first color layer 11 and the second color layer 12, the third color layer 13 has the first width 70 in the first direction X in the position corresponding to the third subpixel 43 and the sixth subpixel 46. In a position where the third color layer 13 overlaps the first light-blocking layer 21, the third color layer 13 has a fourth width 73 which is less than the first width 70 and is less than the second width 71 but is greater than the third width 72 in the first direction X. In a position where the third color layer 13 overlaps the first light-blocking layer 21, the second-directional width in the second direction Y of the third color layer 13 is the same as the width in the second direction Y of the first light-blocking layer 21. Note that, in a position where the third color layer 13 overlaps the first light-blocking layer 21, the second-directional width in the second direction Y of the third color layer 13 may be less than the width in the second direction Y of the first light-blocking layer 21.

Each of the first color layer 11, the second color layer 12, and the third color layer 13 is a color layer corresponding to any one of red, green and blue. For example, the first color layer 11 is a blue layer, the second color layer 12 is a green layer, and the third color layer 13 is a red layer.

Note that a fourth color layer as a white (or transparent) layer may be further provided. In that case, the first color layer 11 may be provided in the first subpixel 41, and the fourth color layer may be provided in the fourth subpixel 44. Further, the fourth color layer may also be formed as the color layer which overlaps with the first light-blocking layer 21.

The first light-blocking layers 21 are formed below the first color layer 11, the second color layer 12, and the third color layer 13, respectively. The second light-blocking layers 22 overlap the adjacent end portions of the first color layer 11, the second color layer 12, and the third color layer 13.

In the positions where the first color layer 11, the second color layer 12, and the third color layer 13 overlap the first light-blocking layers 21, the first color layer 11, the second color layer 12, and the third color layer 13 are not necessarily have the above-described widths in the first direction X. For example, the first color layer 11 may have the third width 72, the second color layer 12 may have the fourth width 73, and the third color layer 13 may have the second width 71.

Further, although the second light-blocking layer 22 is arranged below the color layer 1 in the example of shown in the drawing, the second light-blocking layer 22 may be arranged above the color layer 1.

FIG. 10 is a sectional view of a part of the second substrate 200 along line V-V' of FIG. 9.

The second substrate 200 is formed of a transparent substrate such as a glass substrate, namely, a second insulating substrate 4. The second substrate 200 comprises the color layer 1, the light-blocking layer 2, and an overcoat layer 3 and the like below the second insulating substrate 4.

In FIG. 10, the color layer 1 includes the first color layer 11 formed of a blue-colored resin material, the second color layer 12 formed of a green-colored resin material, and the third color layer 13 formed of a red-colored resin material.

The light-blocking layer 2 includes the first light-blocking layer 21 and the second light-blocking layer 22 and is formed of a black resin material or a light-blocking metal material. In the example shown in the drawing, the first light-blocking layer 21 and the second light-blocking layer 22 are formed below the color layer 1 as the same single layer.

Note that the second light-blocking layer 22 may be formed between the second insulating substrate 4 and the color layer 1.

The overcoat layer 3 is formed below the color layer 1 and the light-blocking layer 2. The overcoat layer 3 flattens the unevenness of the color layer 1 and the light-blocking layer 2. The overcoat layer 3 is formed of a transparent resin material. Below the overcoat layer 3, a second alignment film (not shown in the drawing) is formed. For example, the second alignment film is formed of a material having a horizontal alignment property and is provided on a surface of the second substrate 200 which is in contact with the liquid crystal display 300.

Note that the overcoat layer 3 may be formed between the color layer 1 and the light-blocking layer 2.

FIG. 11 is a sectional view of a part of a display panel 1000 along line VI-VI' of FIG. 9.

The first substrate 100 is formed of a transparent substrate such as a glass substrate, namely, a first insulating substrate 5. The first substrate 100 comprises a common electrode 10, a pixel electrode 9, a switching element 8 (not shown in the drawing), and the like above the first insulating substrate 5.

The common electrode 10 is formed above the first insulating layer 51. The common electrode 10 is formed of a transparent conductive material such as indium tin oxide (ITO) or indium zinc oxide (IZO). The common electrode 10 is covered with a second insulating layer 52.

The pixel electrode 9 is formed above the second insulating layer 52 and is opposed to the common electrode 10. Note that, although the pixel electrode 9 comprises slits 91 (see FIG. 2) elongated in the second direction Y, detailed illustration is omitted. The pixel electrode 9 is formed of a transparent conductive material such as indium tin oxide (ITO) or indium zinc oxide (IZO). The pixel electrode 9 is covered with a first alignment film (not shown in the drawing). The first alignment film is also formed above a part of the second insulating layer 52 where the pixel electrode 9 is not formed. For example, the first alignment film is formed of a material having a horizontal alignment property and is provided on a surface of the first substrate 100 which is in contact with the liquid crystal display 300.

The second substrate 200 is formed of a transparent substrate such as a glass substrate, namely, a second insulating substrate 4. The second substrate 200 comprises the color layer 1, the light-blocking layer 2, and an overcoat layer 3 and the like below the second insulating substrate 4.

In FIG. 11, the color layer 1 only includes the second color layer 12 which is formed of a green-colored resin material.

The light-blocking layer 2 is formed of a black resin material or a light-blocking metal material. In the example shown in the drawing, the light-blocking layer 2 is formed between the subpixels adjacent to each other in the second direction Y. The light-blocking layer 2 overlaps the second color layer 12.

The overcoat layer 3 is formed below the color layer 1 and the light-blocking layer 2. The overcoat layer 3 flattens the unevenness of the color layer 1 and the light-blocking layer 2. The overcoat layer 3 is formed of a transparent resin material. Below the overcoat layer 3, a first alignment film (not shown in the drawing) is formed. For example, the first alignment film is formed of a material having a horizontal alignment property and is provided on a surface of the second substrate 200 which is in contact with the liquid crystal display 300.

Note that the overcoat layer 3 may be formed between the color layer 1 and the light-blocking layer 2.

The first substrate 100 and the second substrate 200 are arranged such that the first alignment film and the second alignment film are opposed to each other. At this time, a predetermined cell gap is formed between the first substrate 100 and the second substrate 200 by a spacer (not shown in the drawing). In a state where the cell gap is formed by the spacer, the first substrate 100 and the second substrate 200 are attached to each other with a sealing member 50 (see FIG. 1). The liquid crystal layer 300 is formed of a liquid crystal composition which contains liquid crystal molecules and is sealed in the cell gap between the first alignment film of the first substrate 100 and the second alignment film of the second substrate 200.

In the display panel 1000 which has the above-described structure, a backlight 80 is provided on the lower side. Note that the backlight 80 can have various structures and thus detailed description thereof will be omitted.

Further, a first optical element 81 including a first polarizer is provided on the lower side of the first substrate 100. A second optical element 82 including a second polarizer is provided on the upper side of the second substrate 200.

The third embodiment is different from the first embodiment in the size of the color layer 1 formed above the first light-blocking layer 21. More specifically, each color layer is formed above the same first light-blocking layer 21 such that the width of each color layer is different from the width of each subpixel in the first direction X corresponding to each subpixel. Except for the above structure, the third embodiment is the same as the first embodiment.

Next, when the display panel is in an off state where the display panel does not display any image in the active area, the display panel is irradiated with reference light, and the color of the light reflected off the display panel is measured. Here, the display panel of the third embodiment and a display panel of a comparative example are prepared, and then the colors of the light reflected off these display panels are measured. The display panel of the comparative example is different from the display panel of the third embodiment in that the light-blocking layer is formed entirely above the color layer.

Figure 12:
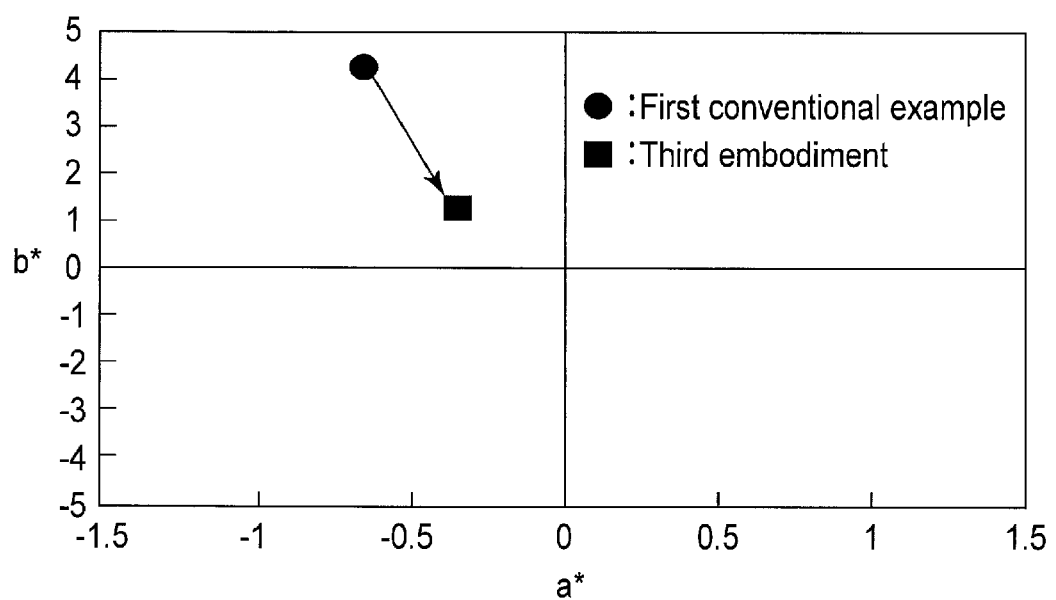
FIG. 12 is a diagram showing an example of the color of reflected light which is reflected off the surface of the display panel 1000 of the third embodiment.

FIG. 12 is a diagram showing an example of the color of the light reflected off the surface of the display panel 1000 of the third embodiment.

More specifically, FIG. 12 shows an L*a*b* color specification system chromaticity diagram, and the negative side of the horizontal axis (a*) indicates green, while the positive side of the horizontal axis (a*) indicates red. The negative side of the vertical axis (b*) indicates blue, while the positive side of the vertical axis (b*) indicates yellow.

In the diagram, the rectangle mark indicates the color of the reflected light of the display panel 1000 of the third embodiment, while the circle mark indicates the color of the reflected light of the display panel 1000 of the comparative example. In the comparative example, external light which enters the display panel 1000 is mostly reflected off the light-blocking layer 2. That is, the color of the light reflected off the light-blocking layer 2 has a great contribution to the color of the reflected light of the display panel 1000, and thus the reflected light of the display panel 1000 is recognized as yellowish light.

On the other hand, in the third embodiment, the external light which enters the display panel 1000 is influenced by the second light-blocking layer 22 as well as the first color layer 11, the second color layer 12, and the third color layer 13 formed above and the first light-blocking layer 21. That is, the reflected light of the display panel 1000 of the third embodiment includes the light which is directly reflected off the second light-blocking layer 22 as well as the light which is reflected off the first light-blocking layer 21 and is then transmitted through the first color layer 11, the second color layer 12, or the third color layer 13.

In the display panel 1000 of the third embodiment, as compared to the color of the light reflected off the second light-blocking layer 22, the color of the light reflected off the first light layer 21 and transmitted through the first color layer 11, the second color layer 12, or the third color layer 13 formed above the first light layer 21 has a greater contribution to the color of the reflected light of the display panel 1000. Therefore, in the third embodiment, as compared to the comparative example, yellow of the reflected light is suppressed, and the color of the reflected light shifts toward blue.

Note that, although only the color change of the reflected light in the third embodiment is described above, it is also possible to change the color of the reflected light toward neutral in the first embodiment and the second embodiment in a manner similar to that of the third embodiment.

According to the third embodiment, it is possible to design the coloring of the reflected light even more freely by adjusting the size of the color layer 1 above the first light-blocking layer 21.

Note that the size of the color layer arranged above the first light-blocking layer 21 may be adjustable according to the color of the reflected light and is not necessarily limited to the above-described width.

In this way, the third embodiment can produce the technical effect the same as those produced by the first embodiment and the second embodiment.

As described above, according to the embodiments, it is possible to provide a liquid crystal display device which can prevent coloring of reflected light which is reflected off the display panel 1000 in an off state of the display panel 1000 where no image is displayed.

Further, according to the embodiments, it is possible to freely design the coloring of the reflected light by providing the color layer 1 above the first light-blocking layer 21 and adjusting the size or the like of the color of the color layer 1.

Next, the fourth embodiment will be described.

In the following, only distinguished features of the fourth embodiment will be described, and description of features the same as those of the first embodiment will be appropriately omitted.

FIG. 13 is a plan view of a part of a second substrate 200 of the fourth embodiment. A first color layer 11 extends in the second direction Y such that the first color layer 11 is above the first subpixel 41 and the second subpixel 44. A second color layer 12 extends in the second direction Y such that the second color layer 12 is commonly formed above the second subpixel 42 and the fifth subpixel 45. A third color layer 13 extends in the second direction Y such that the third color layer 13 is commonly formed above the third subpixel 43 and the sixth subpixel 46.

Each end (or edge) of the first color layer 11, the second color layer 12, and third color layer 13 overlaps a part of each second light-blocking layer 22 corresponding to each end. Each end of the first to third color layer 11 to 13 overlaps approximately a half width in the direction X of each second light-blocking layer 21 corresponding to the end, and adjacent ends of color layers are sharing the width in the first direction X of the second light-blocking layer 22.

Next, to adjust the color of the light reflected off the light-blocking layers to a desired color, adjustment color layers 11a, 12a and 13a are formed on the different first color-blocking layers 21, respectively. The width in the second direction Y of each of the adjustment color layers 11a, 12a and 13a is substantially the same as the width in the second direction Y of each of the first light-blocking layers 21, and the length in the first direction X is adjusted such that the light reflected off the light-blocking layer has a desired color. To obtain a desired color according to the arrangement pattern or the area of the color layer, the length of each of the adjustment color layers 11a, 12a and 13a is determined beforehand from experiments with test models.

The above-described embodiments can be descried as follows.

1. A display device 100 comprising:
a first substrate 100 including a gate line 6 formed on the first substrate 100 and extending in the first direction X, and a source line 7 formed on the first substrate 100 and extending in a second direction Y crossing the first direction;
a second substrate 200 opposed to the first substrate 100, and including a first light-blocking layer 21 formed at a position opposed to the gate line 6, and a second light-blocking layer 22 formed at a position opposed to the source line 7, wherein
a subpixel 41 is formed at a position on the first substrate and defined by the gate line 6 and the source line 7;
the color layer 1 has a first width WD1 in the first direction at a position corresponding to the subpixel,
the first width WD1 is greater than a width of the subpixel in the first direction X, and
the color layer 1 has a width different from the first width WD1 at a position where the color layer overlaps the first light-blocking layer 21.

2. The display device of item 1, wherein a width WD3 of the first light-blocking layer 21 in the second direction Y is greater than a width WD4 of the second light-blocking layer 22 in the first direction X.

3. The display device of item 1, wherein the second light-blocking layer 22 is formed between the first substrate and the color layer.

4. The display device of item 1, wherein the second substrate 200 further comprises an overcoat layer 3, and the overcoat layer 3 covers the light-blocking layer 2 and the color layer 1.

5. The display device of item 1, wherein the second substrate 200 further comprises an overcoat layer 3, and the overcoat layer 3 is formed between the first light-blocking layer 21 and the color layer 1.

6. The display device of item 1, wherein
the subpixel includes a first subpixel, a second subpixel and a third subpixel which are arranged in order in the first direction, and a fourth subpixel, a fifth subpixel and a sixth subpixel which are adjacent to the first subpixel, the second subpixel and the third subpixel in the second direction and are arranged in order in the first direction, and
the color layer 1 includes a first color layer 11 formed in the first subpixel and the fourth subpixel, a second color layer 12 formed in the second subpixel and the fifth subpixel, and a third color layer 13 formed in the third subpixel and the sixth subpixel.

7. The display device of item 6, wherein as shown in FIG. 6, the first color layer 11 is continuously formed across the first subpixel and the fourth subpixel, the second color layer 12 is individually formed in each of the second subpixel and the fifth subpixel in an island shape, and the third color layer 13 is continuously formed across the third subpixel and the sixth subpixel.

8. The display device of item 7, wherein one of the first color layer and the third color layer has a width WD5 greater than the first width WD1 in a position where the one of the first color layer and the third color layer overlaps the first light-blocking layer.

9. The display device of item 8, wherein the color layer has a width equal to or less than a width of the first light-blocking layer in the second direction in a position where the color layer overlaps the first light-blocking layer.

10. The display device of item 6, wherein as shown in FIG. 3, the first color layer 11 includes a first extension portion (portion overlapping the first light-blocking layer in the first row) extending in the first direction X, the second color layer 12 includes a second extension portion (portion overlapping the first light-blocking layer in the second row) extending in the first direction X, the third color layer includes a third extension portion 13 (portion overlapping the first light-blocking layer in the third row) extending in the first direction, and
the first extension portion, the second extension portion and the third extension overlap the first light-blocking layers located in different positions, respectively.

11. The display device of item 6, wherein as shown in FIG. 9, the first color layer 11 includes a first extension portion (portion overlapping the first light-blocking layers in the first to third rows) extending in the first direction, the second color layer 12 includes a second extension portion (portion overlapping the first light-blocking layers in the first to third rows) extending in the first direction, the third color layer 13 includes a third extension portion (portion overlapping the first light-blocking layers in the first to third rows) extending in the first direction,
the first extension portion, the second extension portion and the third extension are formed in positions where the first extension portion, the second extension portion and the third extension overlap the first light-blocking layers 21, and
the first extension portion, the second extension portion and the third extension portion have different widths (71, 72 and 73) in the first direction.

12. The display device of item 11, wherein the first extension portion, the second extension portion and the third extension portion are formed such that the first extension portion, the second extension portion and the third extension portion do not overlap each other.

Note that the above-described embodiments also include technical features of a color filter substrate and a method of manufacturing the same.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
a first substrate including a gate line formed on the first substrate and extending in a first direction, and a source line formed on the first substrate and extending in a second direction crossing the first direction;

a second substrate opposed to the first substrate, and including a light-blocking layer and a color layer formed between the second substrate and the light-blocking layer, wherein the light-blocking layer includes a first light-blocking layer formed at a position opposed to the gate line, a second light-blocking layer formed at a position opposed to the source line, the color layer includes a first color layer, a second color layer, and a third color layer extending in the second direction, respectively, the first color layer is adjacent to the second color layer and has a first extension portion extending in the first direction, the second color layer is located between the first color layer and the third color layer and has a second extension portion extending in the first direction, the third color layer is adjacent to the second color layer and has a third extension portion extending in the first direction, the second light-blocking layer is located between the first color layer and the second color layer and between the second color layer and the third color layer, the first light-blocking layer overlaps the first extension portion, the second extension portion, and the third extension portion, respectively, and the first extension portion, the second extension portion, and the third extension portion do not overlap each other.

2. The display device of claim 1, wherein a width of the first light-blocking layer in the second direction is greater than a width of the second light-blocking layer in the first direction.

3. The display device of claim 1, wherein the second light-blocking layer is formed between the first substrate and the color layer.

4. The display device of claim 1, wherein
the second substrate further comprises an overcoat layer, and
the overcoat layer covers the first and second light-blocking layers and the color layer.

5. The display device of claim 1, wherein
the second substrate further comprises an overcoat layer, and
the overcoat layer is formed between the first light-blocking layer and the color layer.

6. The display device of claim 1, wherein
a subpixel is formed at a position on the first substrate and defined by the gate line and the source line,
the subpixel includes a first subpixel, a second subpixel and a third subpixel which are arranged in order in the first direction, and a fourth subpixel, a fifth subpixel and a sixth subpixel which are adjacent to the first subpixel, the second subpixel and the third subpixel in the second direction and are arranged in order in the first direction,
the first color layer is formed in the first subpixel and the fourth subpixel, the second color layer is formed in the second subpixel and the fifth subpixel, and the third color layer is formed in the third subpixel and the sixth subpixel.

7. The display device of claim 6, wherein
the first color layer is continuously formed across the first subpixel and the fourth subpixel,
the second color layer is individually formed in each of the second subpixel and the fifth subpixel in an island shape, and
the third color layer is continuously formed across the third subpixel and the sixth subpixel.

8. The display device of claim 7, wherein one of the first color layer and the third color layer has a width in the first direction greater than the first width in a position where the one of the first color layer and the third color layer overlaps the first blocking layer.

9. The display device of claim 8, wherein the color layer has a width equal to or less than a width of the first light-blocking layer in the second direction in a position where the color layer overlaps the first light-blocking layer.

10. The display device of claim 1, wherein
the first extension portion, the second extension portion and the third extension portion overlap the first light-blocking layers located in different positions.

11. The display device of claim 6, wherein
the first color layer is blue,
the second color layer is green, and
the third color layer is red.

* * * * *

UNITED STATES PATENT AND TRADEMARK OFFICE
CERTIFICATE OF CORRECTION

PATENT NO. : 10,268,064 B2
APPLICATION NO. : 15/360097
DATED : April 23, 2019
INVENTOR(S) : Jin Hirosawa et al.

Page 1 of 1

It is certified that error appears in the above-identified patent and that said Letters Patent is hereby corrected as shown below:

On the Title Page

Item (30), the Foreign Application Priority Data information is incorrect. Item (30) should read:
-- (30) Foreign Application Priority Data
Nov. 27, 2015 (JP) ..................... 2015-231994 --

Signed and Sealed this
Twenty-first Day of April, 2020

Andrei Iancu
*Director of the United States Patent and Trademark Office*